United States Patent
Kalkan et al.

(10) Patent No.: US 7,776,425 B2
(45) Date of Patent: Aug. 17, 2010

(54) NANOPARTICLE COATED NANOSTRUCTURED SURFACES FOR DETECTION, CATALYSIS AND DEVICE APPLICATIONS

(75) Inventors: Ali Kaan Kalkan, State College, PA (US); Stephen J. Fonash, State College, PA (US)

(73) Assignee: The Penn State Research Foundation, University Park, PA (US)

( * ) Notice: Subject to any disclaimer, the term of this patent is extended or adjusted under 35 U.S.C. 154(b) by 1224 days.

(21) Appl. No.: 10/542,951

(22) PCT Filed: Jan. 21, 2004

(86) PCT No.: PCT/US2004/001696
§ 371 (c)(1),
(2), (4) Date: Jul. 21, 2005

(87) PCT Pub. No.: WO2004/108589
PCT Pub. Date: Dec. 16, 2004

(65) Prior Publication Data
US 2006/0141268 A1    Jun. 29, 2006

Related U.S. Application Data

(60) Provisional application No. 60/441,743, filed on Jan. 21, 2003.

(51) Int. Cl.
*B32B 9/00*      (2006.01)
*B32B 18/00*    (2006.01)
*B32B 9/04*      (2006.01)

(52) U.S. Cl. ........................ 428/210; 428/428; 428/446; 977/707; 977/723; 977/764; 977/778; 977/784

(58) Field of Classification Search ................ 428/210, 428/428, 446; 977/707, 723, 764, 778, 784
See application file for complete search history.

(56) References Cited

U.S. PATENT DOCUMENTS 5,726,524 A * 3/1998 Debe .......................... 313/309
6,149,868 A    11/2000 Natan et al.

(Continued)

OTHER PUBLICATIONS

Zhang et al. "Synthesis of Ordered Single Crystal Silicon Nanowire Arrays" Advanced Materials, vol. 13, Iss. 16, Aug. 2001, pp. 1238-1241.*

(Continued)

*Primary Examiner*—Timothy M Speer
*Assistant Examiner*—Jonathan C Langman
(74) *Attorney, Agent, or Firm*—Gifford, Krass, Sprinkle, Anderson & Citkowski, P.C.

(57) ABSTRACT

A non-vacuum-based, non-collodial chemistry-based method of synthesizing metal nanoparticles and nanoparticle-nanostructured material composites obtained by that method. An embodiment of the method of this invention for fabricating a nanoparticle-nanostructured material composite and synthesizing nanoparticles includes preparing a nanostructured/nanotextured material, and, contacting the nanostructured/nanotextured material with a solution. Nanoparticles are synthesized on the nanostructured/nanotextured material as a result of the contact. The method of the present invention can be utilized to fabricate SPR and SERS substrates for sensing and detection. Additional systems based on this approach (e.g., surface plasmon resonance absorption and alloying sensors and nanocatalysts) are described.

7 Claims, 13 Drawing Sheets

U.S. PATENT DOCUMENTS

| | | | |
|---|---|---|---|
| 6,262,129 | B1 | 7/2001 | Murray et al. |
| 6,660,152 | B2 | 12/2003 | Nayfeh et al. ............... 205/109 |
| 6,741,019 | B1 * | 5/2004 | Filas et al. ................. 313/355 |
| 2002/0179564 | A1 | 12/2002 | Geobegan et al. |
| 2003/0089611 | A1 | 5/2003 | Nayfeh et al. ............... 205/109 |
| 2003/0178571 | A1 | 9/2003 | Nayfeh et al. ............... 250/372 |

OTHER PUBLICATIONS

Sun et al. "Surface Reactivity of Si Nanowires", Journal of Applied Physics, vol. 89, No. 11, Jun. 2001, pp. 6396-6399.*

C. Sönnichsen et al., "Drastic Reduction of Plasmon Damping in Gold Nanorods," Physical REV Iew Letters, vol. 88, No. 7, Feb. 18, 2002.

Lon A. Porter, Jr., et al., "Controlled Electroless Deposition of Noble Metal Nanoparticle Films on Germanium Surfaces," NanoLetters, vol. 2, No. 10, 2002, 1067-1071, published on Web Sep. 7, 2002.

Lon A. Porter, Jr., et al., "Electroless Nanoparticle Film Deposition Compatible with Photolithography, Microcontact Printing, and Dip-Pen Nanolithography Patterning Technologies, "NanoLetters, vol. 2, No. 12, 2002, 1369-1372, published on Web Oct. 29, 2002. *

Katrin Kneipp, et al., "Single Molecule Detection Using Surface-Enhanced Raman Scattering (SERS)," Physical Review Letters, The American Physical Society, Mar. 3, 1997, vol. 78, No. 9, pp. 1667-1669.

Seki, H., "SERS of pyridine on AG island films prepared on a sapphire substrate, " J. Vac. Sci Technol. , American Vacuum Society, Mar. 1981, vol. 18, No. 2.

* cited by examiner

NANOPARTICLE COATED NANOSTRUCTURED SURFACES FOR
DETECTION, CATALYSIS AND DEVICE
APPLICATIONS

BACKGROUND OF THE INVENTION

This invention relates generally to nanoparticles and nanostructures and specifically to a method for coating nanoparticles on nanostrustured surfaces and systems and devices fabricated by the method of this invention.

Metal (e.g., Ag, Au and Cu) nanoparticles can exhibit a strong optical absorption and reflectance in the UV-visible range of the electromagnetic spectrum that is not present in the spectrum of the bulk metal. When the particle size is much smaller than the wavelength of the incident electromagnetic radiation, the electrons in the particle can move in phase which can result in their generating a giant oscillating dipole (or multipole depending on the shape of the particle). This collective motion of the electrons generates surface polarization charges on each side of the particle, which act as a restoring force on these electrons. Because of the restoring force a resonance condition occurs at a certain frequency at which the amplitude of the oscillating dipole can be excited to a maximum. These collective electron oscillation modes are termed particle plasmons, localized surface plasmons or simply surface plasmons. (see P. Mulvaney, MRS Bulletin 26, 1009 (2001).)

These plasmon modes can be excited by electromagnetic radiation (photon) absorption. They can also be excited by high energy electron collisions. The associated absorption of the electromagnetic energy (photons) for the generation of these collective electron oscillation modes is seen as a band in the optical absorption spectrum and is called the surface plasmon absorption band. It is well established that plasmon energy of particles (e.g., the wavelength or frequency of the surface plasmon absorption peak) is dependent upon size, shape, and interparticle spacing as well as on particle and local environment dielectric properties. When the particle size increases (or when nanoparticles aggregate so electrons can travel from one nanoparticle to another) electrons become dephased and they cannot generate a strong restoring force. Consequently, the plasmon absorption band broadens and gets weaker.

Metal nanoparticles also exhibit interesting electronic, magnetic and catalytic properties that are not present in the bulk metal. These unique properties of nanoparticles are tunable by varying particle size, shape and spacing. For example, colloidal suspensions of gold can be red, purple, or blue, depending on the size, spacing and environment of the gold particles. In addition, gold clusters on a titania surface have been shown to yield catalytic oxidation of carbon monoxide that becomes most effective when the cluster diameter is reduced to about 3 nm. Hence, metal nanoparticles or nanostructured metal surfaces with their unique properties and enhanced surface area offer exciting opportunities for the development of novel sensors and detectors, catalysts, and absorbing and adsorbing media.

Nanoparticle Surface Plasmon Resonance (SPR) spectroscopy is a sensing/detection application based on exploiting the interaction of plasmons with electromagnetic radiation. SPR has been extensively used to monitor a broad range of analyte-surface binding interactions including the adsorption of small molecules, ligand-receptor binding, protein adsorption, antibody-antigen binding, DNA and RNA hybridization and protein-DNA interactions. (see A. J. Haes and R. P. Van Duyne, J. Amer. Chem. Soc. 124, 10596 (2002).) Heretofore, the sensing mechanism of SPR spectroscopy has been focused on using the shift in SPR energy of a noble metal nanoparticle that occurs in response to a change in the surrounding refractive index. (See A. J. Haes and R. P. Van Duyne, J. Amer. Chem. Soc. 124, 10596 (2002)). See also C. Sönnichsen, S. Geier, N. E. Hecker, G. von Plessen, J. Feldmann, H. Ditlbacher, B. Lamprecht, J. R. Krenn, F. R. Aussenegg, V. Z-H. Chan, J. P. Spatz, and M. Möller, Appl. Phys. Lett. 77, 2949 (2000)). These surrounding-medium index of refraction changes are due to events such as analyte binding at or near the nanoparticle surface. The refractive index sensitivity of SPR biosensors and chemosensors based on analyte binding at or near the nanoparticle surface has been reported to be on the order of 1 part in $10^5$-$10^6$ corresponding to an areal mass sensitivity of 10-1 pg/mm$^2$.

Another plasmon-electromagnetic interaction that can be exploited for sensing and detection is surface enhanced Raman scattering. It offers detailed information on molecules, which is a highly demanded capability in various disciplines such as analytical chemistry, molecular biology, pharmacology, nanotechnology, homeland security, and environmental science. In particular, observation of physical and chemical effects in a single molecule is of basic scientific interest and can provide insight into the individual properties of the molecules. Such insight can be lost or masked in ensemble-averaged measurements. In the past decade, fluorescence spectroscopy has proven to be a useful technique for probing single molecules. However, the broad fluorescence bands are relatively insensitive to molecular structure. Furthermore, because the excitation energy is in resonance with electronic transitions during fluorescence, probed molecules rapidly undergo photodecomposition, reducing the time during which a molecule is available for fluorescence detection. Also the above mentioned SPR shifts lack detailed information; i.e., an SPR shift only shows that some binding event at or near the nanoparticle surface or some absorption has occurred On the other hand, surface-enhanced Raman scattering (SERS) has emerged as one of the most sensitive spectroscopic methods available for the detection of a wide range of adsorbate molecules down to the single molecule detection limit. (See K. Kneipp, H. Kneipp, I. Itzkan, R. R. Dasari, and M. S. Feld, Chem. Rev. 99, 2957 (1999). The use of Raman scattering to investigate adsorbates on surfaces was initially thought to be of insufficient sensitivity due to the extremely small cross sections associated with this effect ($-10^{-30}$ cm$^2$ per molecule which is 14 orders of magnitude smaller than that of a fluorescent dye molecule in fluorescence). However, this situation can be dramatically improved in SERS where the cross sections can be enhanced up to $10^{14}$-$10^{15}$ times. (See S. Nie and S. R. Emory, Science 275, 1102 (1997)—K. Kneipp, Y. Wang, H. Kneipp, L. T. Perelman, I. Itzkan, R. R. Dasari, and M. S. Feld, Phys. Rev. Lett. 78, 1667 (1997)) SERS simply involves spectral measurement of the Raman scattered light from an analyte material (e.g., molecules) adsorbed on or attached to metal nanoparticles (or vice versa) of subwavelength dimensions. In SERS, the frequency of the incident as well as the scattered light is around that of the surface plasmons in the metal nanoparticles. Once the surface plasmon modes are excited and in resonance with the impinging electromagnetic field such as an impinging laser beam, strong dipoles are induced in the metal nanoparticles that in turn develop strong local electric fields (associated with electromagnetic field) in the vicinity of the nanoparticle surfaces. This region of strong local electric fields overlaps the location of the molecules adsorbed or bonded on or near the nanoparticle surfaces. This amplification in local electric field is for both the incident light and Raman scattered light. Consequently, to a first approximation the enhancement in Raman scattering caused by the adsorbed molecules varies as the fourth power of the attenuation in incident electric field (See K. Kneipp, Y. Wang, H. Kneipp, L. T. Perelman, I. Itzkan, R. R. Dasari, and M. S. Feld, Phys. Rev. Lett. 78, 1667 (1997).) Therefore, enormous gains are possible in the intensity of the SERS signal and, therefore, enormous increases in the fingerprinting capability for molecules in the overlap volume.

Another advantage of SERS is that, unlike in fluorescence, photodecomposition of probed molecules can be avoided in SERS since the incident light is not required to be in resonance with the molecular transitions causing the Raman scattering. Furthermore, since the SERS vibrational spectrum contains detailed structural information about the molecule, the molecular fingerprinting can be very specific. Finally, because vibrational states have shorter lifetimes than electronic ones, Raman scattered radiation is more intense than fluorescence by about a factor of $10^3$ under saturation. (See K. Kneipp, Y. Wang, H. Kneipp, L. T. Perelman, I. Itzkan, R. R. Dasari, and M. S. Feld, Phys. Rev. Lett. 78, 1667 (1997).).

Nie and Emory (*Science*, 275, 1102 [1997]), and Kneipp et al. (*Phys. Rev. Lett.* 78, 1667 [1997]) independently achieved the first demonstration of single molecule detection by SERS that involved enhancement factors of about $10^{14}$. Both groups detected single dye molecules attached to colloidal silver particles in an aqueous solution. Alternative SERS practice demonstrated by others is to use substrates coated with metal nanoparticles rather than solutions with nanoparticles. (See M. Moskovits, Rev. Mod. Phys. 57, 783 (1985); see also H. Seki, J. Vac. Sci. Technol. 18, 633 (1981).) The advantage of this approach lies in the immobilization of metal particles on the substrate surface. Hence, unlike in the case of colloidal particles suspended in an aqueous solution, complications arising from thermal motion are out of the question. Consequently, immobilization makes it easier to probe a molecule attached on a nanoparticle. Furthermore, aggregation of nanoparticles can be avoided with proper immobilization, as we demonstrate in this invention. Up to now, the substrates for SERS immobilization have been prepared by, for example, evaporation or sputtering of metal island (ultrathin) films, electrochemical roughening of metal surfaces, or patterning of continuous metal films by electron beam lithography.

The most common and simple approach to the synthesis of metal nanoparticles is through colloidal chemistry. This method involves a precipitation reaction in a liquid solution to form the nanoparticles; however, the particles may aggregate unless an appropriate surfactant is used. On the other hand the surfactant may hinder molecular adsorption on the particle surface. Therefore, the surfactant may prevent certain sensing mechanisms if the particles are to be used for sensing. Similarly, the surfactant will degrade the catalytic activity of the nanoparticles. Furthermore, if colloidal particles are desired to be disposed and immobilized on a substrate, it is difficult to obtain nanoparticle arrays at desired uniformity, density, and dispersion by using colloidal nanoparticles.

It has been shown that the solution chemistry of colloidal nanoparticles can be avoided. Specifically, it has been shown that metal nanoparticles can be directly synthesized on a surface by contact of the surface to a metal salt, if that surface material serves as reducer for the said metal salt. This direct synthesis has been demonstrated only for continuous single crystal (non-porous) surfaces of silicon and germanium. Synthesis of nanoparticles has been shown to proceed on Si surfaces only in the presence of HF. The HF is required to remove the oxide so that electron transfer can be maintained and metal deposition can occur. (L. A. Nagahara, T. Ohmori, K. Hashimoto, and A. Fujishima, J. Vac. Sci. Technol. A 11, 763 (1993)) Because reduction proceeds at the expense of oxidation of Si, HF is needed for the dissolution of the oxide, which otherwise hinders the electron transfer. On the other hand, the continuous (flat) Ge surfaces have been found to support electroless growth of noble metal nanoparticle using pure metal salt solutions without HF. (See L. A. Porter, H. C. Choi, A. E. Ribbe, and J. M. Buriak, Nano Lett. 2, 1067 (2002); see also L. A. Porter, H. C. Choi, J. M. Schmeltzer, A. E. Ribbe, L. C. C. Elliott, and J. M. Buriak, Nano Lett. 2, 1369 (2002)) This is easily understood since Ge oxide dissolves in water. (Porter et al.) However, this approach of synthesizing metal nanoparticles on a flat (single crystal) surface offers no control over particle size, spacing and dispersion. An alternative approach to try to solve these deficiencies has been tried. It uses the patterning of continuous metal films by electron beam lithography to form nanoparticles immobilized on a substrate with precise control of size, separation and shape. (See L. Gunarsson, E. J. Bjerneld, H. Xu, S. Petronis, B. Kasemo, and M. Käll, Appl. Phys. Lett. 78, 802 (2001)) However, this technique involves high costs, low throughput and is limited to a minimum particle size of ~1 Onm. Metal nanoparticles can alternatively be obtained by condensation of a metal vapor on a substrate surface in the form of islands. (See H. Seki, J. Vac. Sci. Technol. 18, 633 (1981)) Although vapor deposition is a lower cost and higher throughput process than electron beam lithography, control of particle size and spacing is difficult.

It is an object of this invention to provide a method for synthesizing and immobilizing contaminant-free/surfactant-free metal nanoparticles on a surface with controlled particle size, dispersion, spacing, and density.

It is also an object of the present invention to provide the said method for the fabrication of high-sensitivity, low-background SERS/SPR-sensor/detector devices and systems, and catalytic/absorption/adsorption-sensors/detector devices and systems.

It is yet another object of this invention to provide inexpensive and high-throughput methods for the fabrication of the above referenced devices.

It is a further object of this invention to provide a non-vacuum-based as well as non-colloidal chemistry based method of synthesizing metal nanoparticles.

It is also an object of this invention to provide a method for synthesizing metal nanoparticles that does not require any reducing agents, catalysts, or coating agents to form the metal nanoparticles.

SUMMARY OF THE INVENTION

A non-vacuum-based, non-colloidal chemistry-based method of synthesizing metal nanoparticles and a nanoparticle-nanostructured material composite obtained by that method are disclosed hereinbelow. Applying the methods of this invention, nanoparticles of certain metals, such as but not limited to Au, Ag, Cu, Pd, and Pt, their alloys and compounds, can be controllably synthesized on the surfaces of nanostructured, porous void-column films by exposure of this material to the salt solutions of these metals. These composite nanoparticle (in one embodiment, void-column film) film substrates have been found to yield strong surface plasmon optical absorption and surface enhanced Raman scattering (SERS). Since the method of this invention does not require any reducing agents, coating agents, or catalysts to form the metal nanoparticles, it is very attractive. These particles may be immobilized on the nanostructured material or the material may be used to generate the particles for injection into some fluid flow environment. The metal nanoparticles can be coating-free, immobilized, and disbursed on a surface. The surface may involve anti-reflection systems and reflection coatings for further optical enhancement. The metal nanoparticle creation reaction of this invention is attributed to galvanic displacement, where the film surface itself serves as the reducing agent and electron source for reduction of the metal bearing medium; e.g, a metal salt. In some embodiments of the present invention no HF etching or oxide removal is necessary for nanoparticle forming to occur and, also, no metal coating (catalyst) is needed.

The metal nanoparticle formation process on the substrate (in one embodiment, void-column) film has been observed to persist even after oxide passivation, or after dehydrogenation of the nanostructured Si surface.

An embodiment of the method of this invention for fabricating a nanoparticle-nanostructured material composite and synthesizing nanoparticles includes preparing a nanostructured/nanotextured material, and, contacting the n nanostructured/nanotextured material with a solution. Nanoparticles are synthesized on the nanostructured/nanotextured material as a result of the contact.

The method of the present invention can be utilized to fabricate SPR and SERS substrates for sensing and detection. Additional systems based on this approach (e.g., photovoltaic devices and nanocatalysts) are described herinbelow.

For a better understanding of the present invention, together with other and further objects thereof, reference is made to the accompanying drawings and detailed description and its scope will be pointed out in the appended claims.

DETAILED DESCRIPTION OF THE INVENTION

Figure 1:
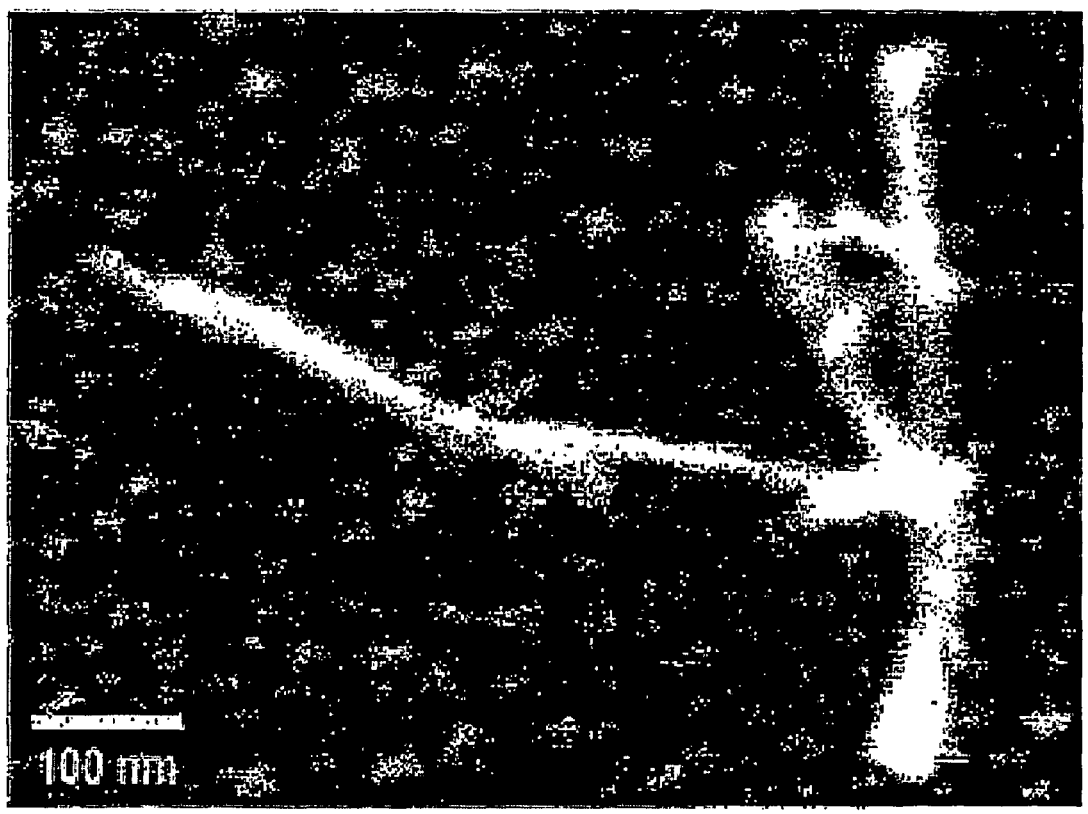
FIG. 1 is a pictorial representation of a micrograph of a nanostructured material used in this invention.

A non-vacuum-based, non-colloidal chemistry-based method of synthesizing metal nanoparticles and nanoparticle-nanostructured material composites obtained by that method are disclosed hereinbelow.

In an embodiment of the method of this invention for synthesizing macro, micro or nanoscale nanoparticles, a fluid stream, carrying a precursor solution is directed over the nanostructured/nanotextured material initiating a nanoparticle synthesis and entraining the nanoparticles in the flow. A fluid stream may be created in a macro, micro or nanoscale fluidics system by either electrokinetic or hydrodynamic pumping. A fluid stream is relative motion of a fluid with respect to the nanostructured material. In one embodiment, but not limited to, a salt solution is stirred in a beaker and the nanostructured material is placed ("dipped"). When the nanostructured material is at rest with respect to the beaker, the nanostructured material will be in a flow stream. The Particle precursor solution is the solution, which includes the metal ions to be reduced by the nanostructured/nanotextured surface of the invention for the synthesis of nanoparticles. Analyte molecules can also be mixed into these solutions as described hereinbelow. The precursor solution may be comprised of, but is not limited to: metallic salts, analytes, proteins, nucleic acids, peptides, cells, cell components, gases, vapors, organic molecules, non-organic molecules, drugs, combinatorial chemistry products, viruses, fungi, bacteria, polar and nonpolar solvents. Nanoparticle formation and composition may be mediated by the application of heat, electric field, electric current and/or light, but this is not required for the process of nanoparticle synthesis. This process can be used to synthesize macro, micro or nanoscale volumes of nanoparticle solutions and other molecules for use in sensing and catalysis. The flow rates will be determined by the scale of the reactor and method fluid pumping but can range anywhere from femtoliters to liters per second.

The nanostructured/nanotextured materials may be formed in either bulk or as a thin film by PECVD, CVD, PVD, casting, etching, electrochemical etching, strain etching, high density plasma deposition, spin coating and/or molding.

The devices of this invention for nanoparticle synthesis, nanoparticle synthesis reactors, may be stand-alone or incorporated into other more complex devices for sensing or analysis. A nanoparticle synthesis reactors includes nanostructured/nanotextured material, a precursor solution, and a fluidics system capable of directing a fluid stream, carrying a precursor solution, over the nanostructured/nanotextured material.

The nanoparticles of this invention being synthesized on the nanostructured/nanotextured material as described above may also be exported from such materials by ultrasonic, thermal, or optical agitation or other means and be injected/transferred into a different medium. This medium could be a polymer solution/layer, liquid crystal layer, protein solution/layer, human/animal skin or tissue, or the membrane of a biological cell in contact with the said nanostructured/nanotextured material. Similarly, the nanoparticles can be injected into a micro/nano cell, micro/nano channel or onto a different surface, which can be nanostructured/nanotextured as well.

(The micro/nano cell, micro/nano channel or the different surface are referred to herein as a different structure.) Furthermore, the nanoparticles can be injected and incorporated into a fluid stream. This injection/transfer processes can take place during or after the particle synthesis on the nanostructured/nanotextured surface.

One embodiment of the method of this invention for fabricating a nanoparticle-nanostructured material composite comprises preparing a material with nano-textured topography, and contacting this material with a solution. The terms nano-textured and nanostructured are used interchangeably herinbelow to refer to embodiments of materials with nano-textured topography. The term nanostructured as used herinbelow refers to the entire range of nano-textured topographies. It should be noted that, although some of the embodiments described below refer to a void-column structure, this invention is not limited to that structure.

In one embodiment, the nanostructured void-column Si films (interconnected void network material) employed in this invention are deposited on Corning 1737 glass substrates using a high density plasma deposition tool (PlasmaTherm SLR 770 ECR-PECVD system). Table I lists the film deposition conditions for this embodiment. SiF4 was incorporated during the deposition process. The impact of SiF4 use is the enhancement of columnar separation along with avoidance of columnar aggregation; hence, a gain is achieved in accessible inner surface area (for subsequent metal nanoparticle adsorption or attachment). For illustration of this embodiment, all experimental data presented hereinbelow was derived using films deposited as in Table I. In one embodiment, the films, after deposition, were immersed in 0.001 M $Ag_2SO_4$ solution.

TABLE I

Process parameters employed in PlasmaTherm SLR 770 ECR-PECVD system to deposit void-column Si films.

| | |
|---|---|
| Upper magnet current | 173 A |
| Lower magnet current | 24 A |
| Substrate temperature | 100° C. |
| Incident microwave power | 400 W |
| Reflected microwave power | 50 W |
| Process pressure | 10 mTorr |
| $SiH_4$ flow rate | 1.5 sccm |
| $SiF_4$ flow rate | 0.7 sccm |
| $H_2$ flow rate | 40 sccm |

FIG. 1 shows a plain micrograph of a typical nanostructured/nanotextured void-column Si film deposited as in Table I. An array of 20-30 nm wide nanocolumns with an average separation of 20 nm is seen comprising a high surface to volume ratio material. As evidenced from detached nanocolumns (i.e., separated from the substrate) lying on the film surface, the shape of the columns is rod-like (nanorods). For most embodiments described hereinbelow, but not limited to, the films used were grown to a thickness of 2000 Å.

Figure 2:
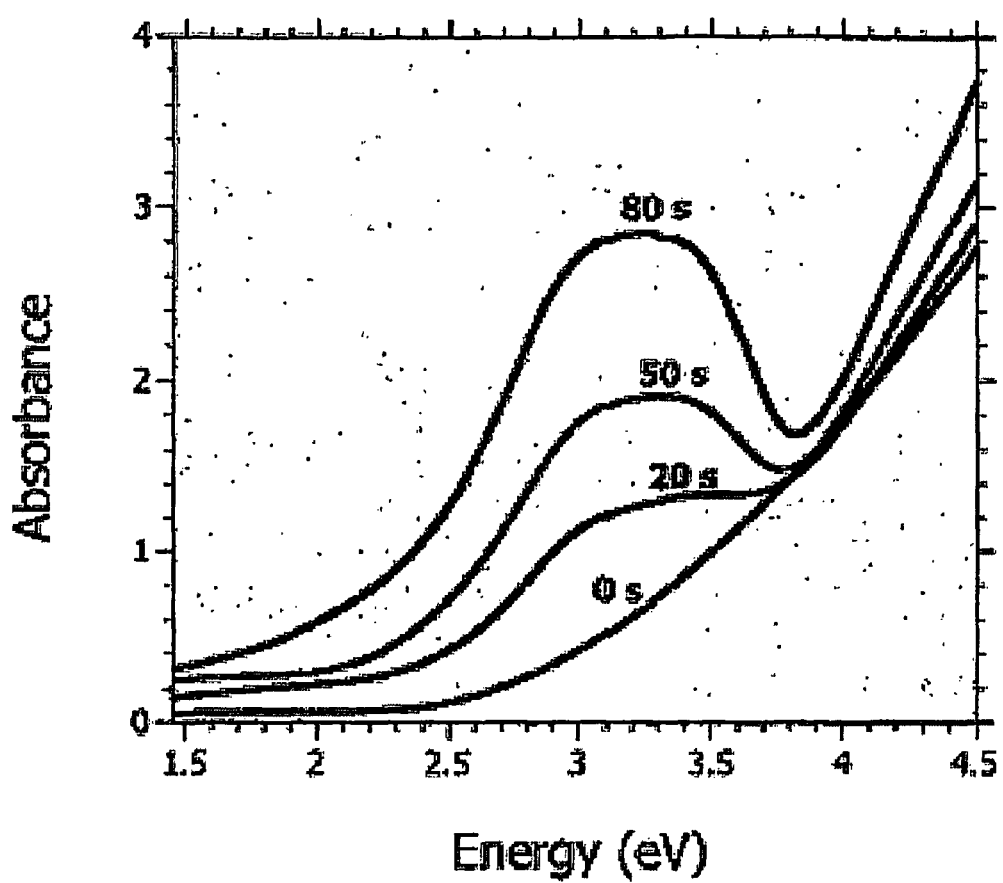
FIG. 2 is a graphical representation of time evolution of optical absorbance for an embodiment of the material of this invention.

FIG. 2 depicts time evolution of optical absorbance of void-column Si films immersed in 0.001 M $Ag_2SO_4$ solution. A systematic increase in absorption with time in the violet-blue region is seen. This translates to the naked eye as a gradual transition from lighter brown to darker brown (transmission).

Figure 3:
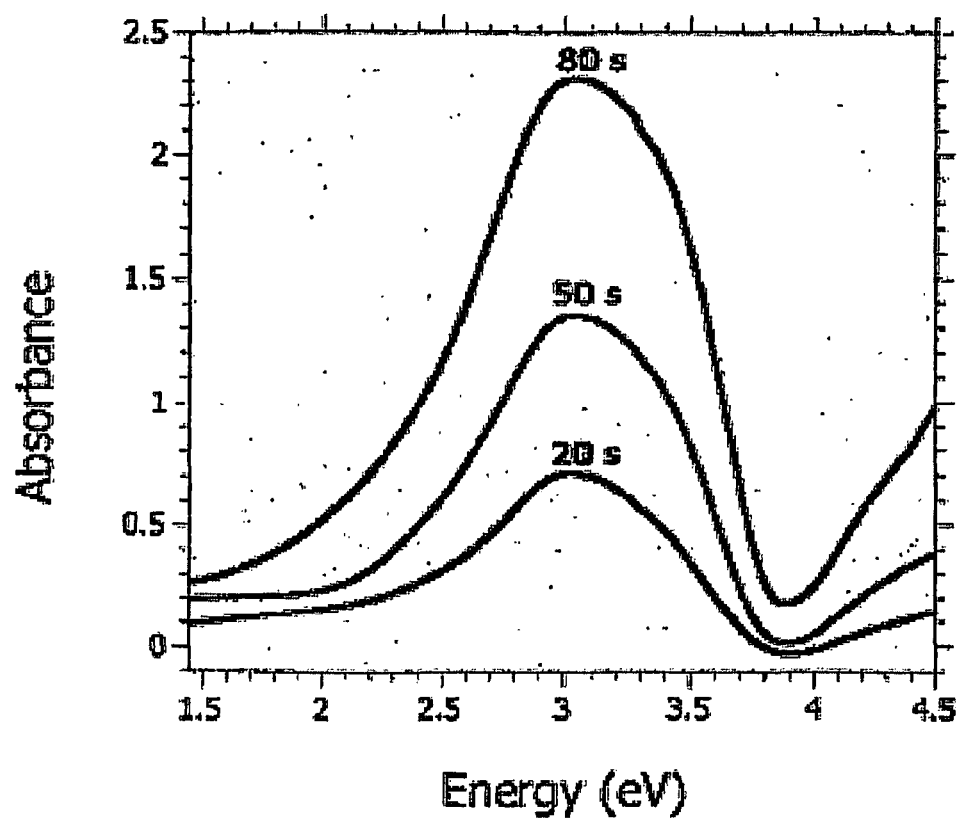
FIG. 3 shows a graphical representation of surface plasmon absorption associated with several embodiments of the material of this invention.

FIG. 3 shows surface plasmon absorption associated with Ag nanospheres synthesized on void-column Si films by immersion in 0.001 M $Ag_2SO_4$ solution for 20, 50 and 80 s. Spectra in FIG. 3 were derived from those in FIG. 2 by subtracting each spectrum from that of unexposed film in order to isolate the effect of deposited Ag from that of Si film and substrate alone. The absorption band peaking at about 3.0 eV is characteristic of surface plasmon resonance associated with Ag nanospheres. (See R. H. Doremus, J. Appl. Phys. 35, 3456 (1964).) This implies that Ag deposition occurs in the form of spherical nanoparticles.

The fact that only the absorption band increases in intensity while its peak persists at the same energy with prolonged exposure shows an increase in particle density with the average particle size remaining the same. This interesting feature may be related to the average columnar separation, which remains unchanged during the immersion exposures, thereby limiting the particle size. This result also implies that there is limited particle aggregation. It is understood that, in addition to functioning as a reducer, the Si nanocolumns further enable monodispersion and narrow size distribution of Ag particles by immobilizing the nanoparticles and substantially constraining their growth.

Figure 4:
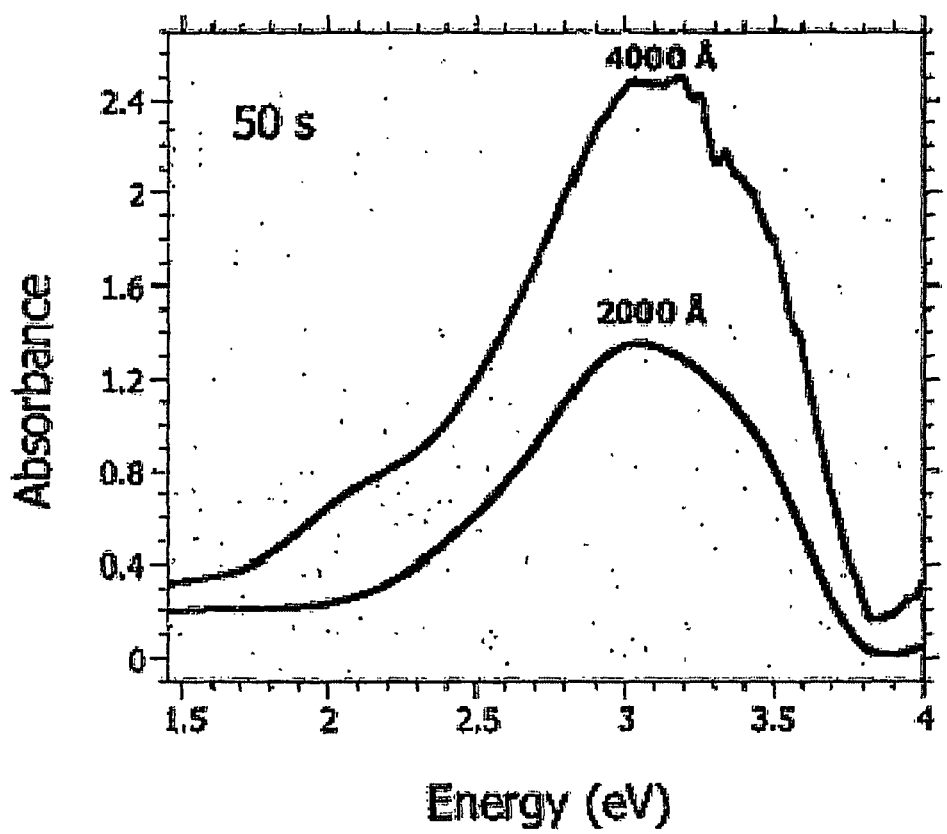
FIG. 4 shows a graphical representation of surface plasmon absorption associated with several embodiments of the material of this invention.

FIG. 4 shows the impact of film thickness on surface plasmon absorption. Both films in FIG. 4 were immersed in 0.001 M $Ag_2SO_4$ solution for 50 s. As evidenced from FIG. 4, metal particle nucleation takes place on other surfaces besides the top surface of the Si film. Surface plasmon absorbance is clearly seen to increase with film thickness. Hence, Ag nanoparticles must also nucleate inside the film, possibly on the lateral surface of Si nanocolumns (throughout the film thickness). The increase in plasmon absorption with Si film thickness indicates that Ag particles are synthesized throughout the thickness of the Si film in a three-dimensional ("3D") array fashion.

Figure 5:
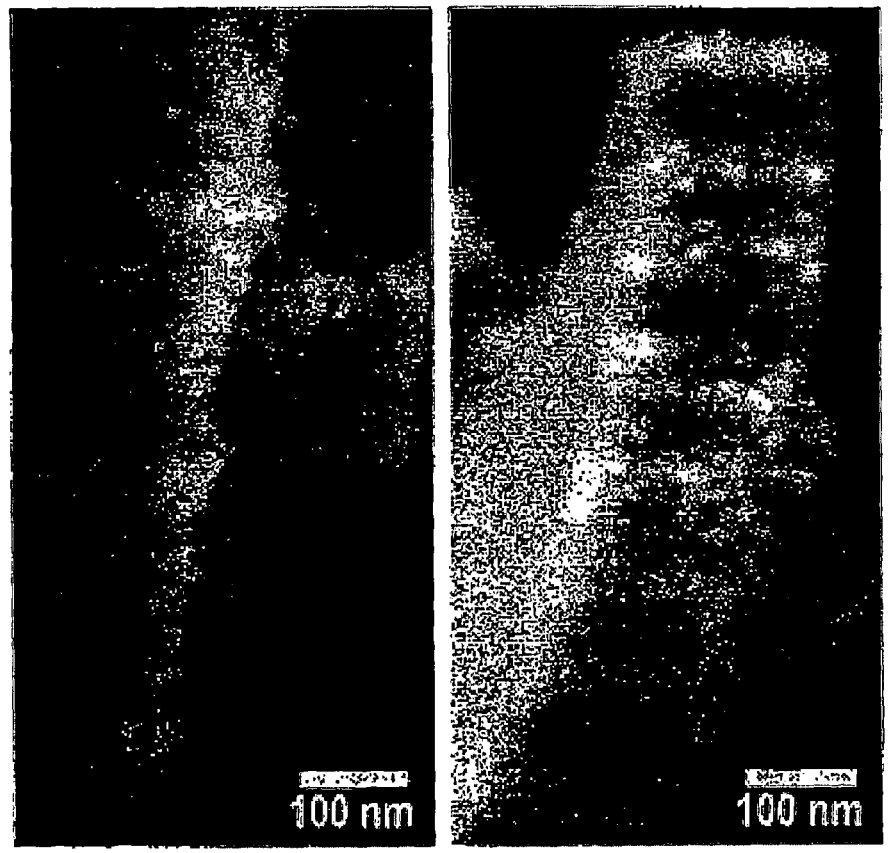
FIG. 5 shows a pictorial representation of cleaved cross sections of another embodiment of the material of this invention.

FIG. 5 shows cleaved cross sections of a nanostructured void-column Si thin film immersed in 0.001 M $Ag_2SO_4$ solution for 80 s. Ag nanoparticles are clearly seen to be synthesized inside the void network. This enables effective adsorption and immobilization of analyte molecules. As shown in FIG. 5, a scanning electron microscope study confirms the presence of monodispersed Ag particles spaced uniformly in between Si nanocolumns whose average size is on the order of columnar spacing. Therefore, the nanostructured Si films not only enable easy synthesis of 3-D arrays of Ag nanoparticles, but also enable monodispersion and narrow size distribution of the nanoparticles without the use of a surfactant.

The interconnected or continuous void volume of the nanostructured Si plays an essential role in the formation of three-dimensional nanoparticle arrays. The interconnected or continuous void network feature of the void-column Si films enables the metal salt solution to reach and occupy the entire void volume, thereby enabling the synthesis of nanoparticles throughout the three-dimensional void network.

Figure 6:
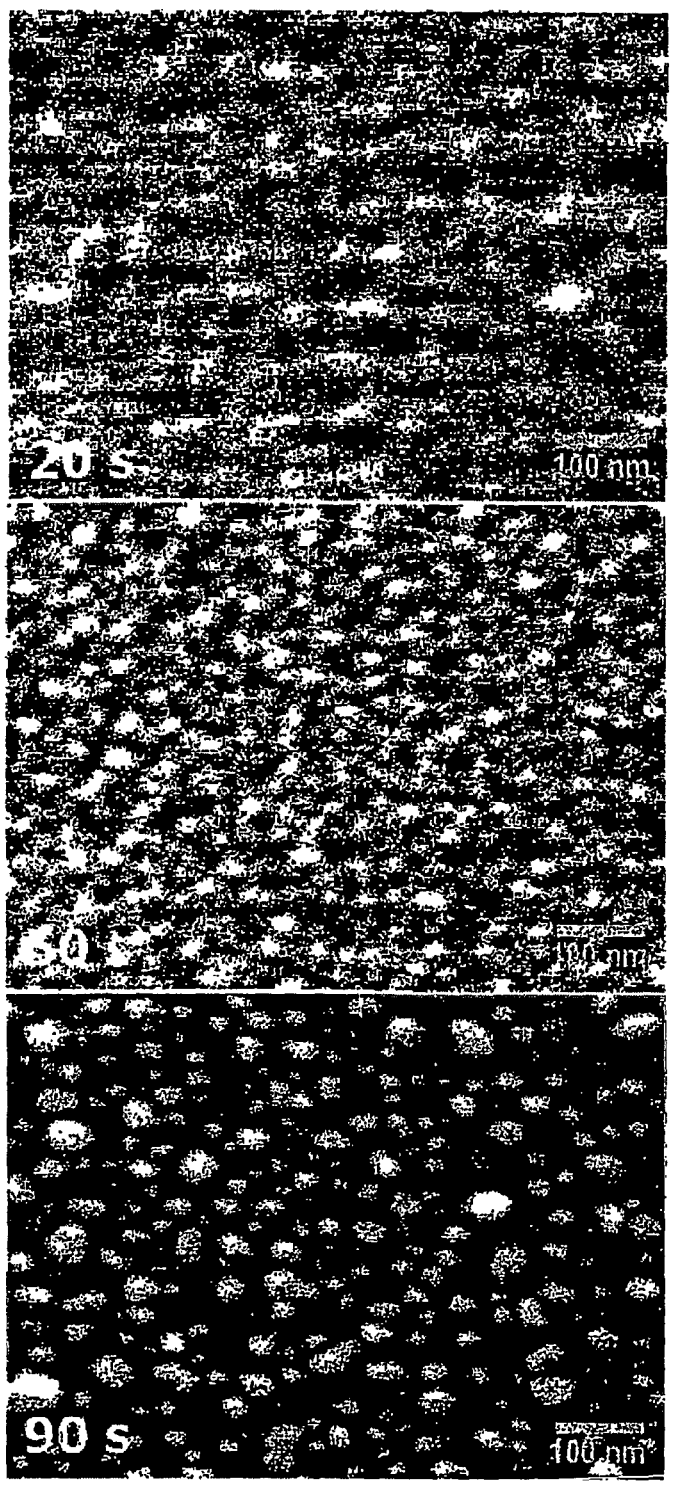
FIG. 6 shows a pictorial representation of scanning electron microscope (SEM) micrographs of various embodiments of this invention.

Scanning electron microscope (SEM) micrographs of the top film surface for various exposure times are shown in FIG. 6. The improved clarity with increased exposure time is attributed to increased conductivity of the films with increased Ag deposition which helps to reduce SEM charging effects. Ag nanospheres of various sizes are clearly seen on the surface of 90 s exposed film. Since there is no constraint on particle size on the top surface of the film, Ag nanoparticles occupying that position on the void-column film may, with additional exposure, grow to the order of the wavelength of light in the visible range. This can lead to bulk-like metallic reflectance emerging with enough immersion time. While FIG. 6, indicates that the nanoparticles are generally spherical, departures from spherical shapes are also possible leading to ellipsoidal nanoparticles.

Although the present invention specifically demonstrates nanostructured void/column Si films being capable of synthesizing, immobilizing and dispersing metal nanoparticles when they are simply in contact with a pure metal salt solution further generalizations are possible. For instance, the nanostructured film/surface material is not restricted to be Si. It can be, but not limited to, an element in the same group as Si such as C, Ge, Sn, Pb. Or it can be, but not limited to, a compound such as boron nitride, gallium arsenide, indium arsenide, indium phosphide, aluminum arsenide, gallium phosphide, gallium nitride, or II-VI compound, such as zinc oxide, zinc sulfide, zinc selenide, cadmium sulfide, cadmium selenide, cadmium telluride, or various other compounds such as titanium, titanium oxide, aluminum, aluminum oxide, nickel, nickel oxide, chrome, chrome oxide, or elements. The nanostructured film or surface material can be comprised of nano-elements such as nanowires, nanorods, nanocolumns, nanotubes, or nanoparticles or various shapes. Or, the nanostructured surface or film can be a nanotextured surface with roughness, features or patterns at the nanometer scale (1 nm to 500 nm). The nanostructured and/or nanotextured surface may be porous, with a typical pore size of 1 to 500 nm.

As discussed, it is known in SPR that, when the particle size is much smaller than the wavelength of the incident electromagnetic radiation, the electrons in the particle move in phase. In so doing, they generate aa oscillating dipole (or multipole depending on the shape of the particle) which has a resonance condition at a certain frequency (plasmon frequency) at which the amplitude of the oscillating dipole can be excited to a maximum. As also noted earlier, the plasmon frequency depends on and is tunable by the type of metal, particle size, shape, and separation, and dielectric constant of the local medium. (See P. Mulvaney, MRS Bulletin 26, 1009 (2001)) The plasmon band shifts to lower frequencies (higher wavelengths) and broadens as the particle size is increased, or particle spacing is decreased, or particle aggregation occurs. The variation plasmon frequency is responsible for the variation of color for metal nanoparticles. For example, the color of Au nanoparticles vary from orange to red as their size is increased from −1 to 3 nm. They look red for the size range of 3-30 nm. Then, as their size is further increased from 30 to 500 nm their color turns purple, then to blue. On the other hand, the color of 10 nm Au particles changes from red to purple to blue to grey as their separation is decreased. The embodiments described herein cover a number of metals and include plasmon bands occurring between 1.45 to 4 eV corresponding to 900-350 nm, or near-infrared (NIR) to ultraviolet (UV). For Cu nanoparticles, the plasmon band will tail into more of the NIR, while for Al nanoparticles, the plasmon band is found in the UV. Thus, for a given desired condition, a size and separation range of the nanoparticles of a certain metal may be selected in order to produce enhanced local fields when excited by an electromagnetic field.

Figure 7:
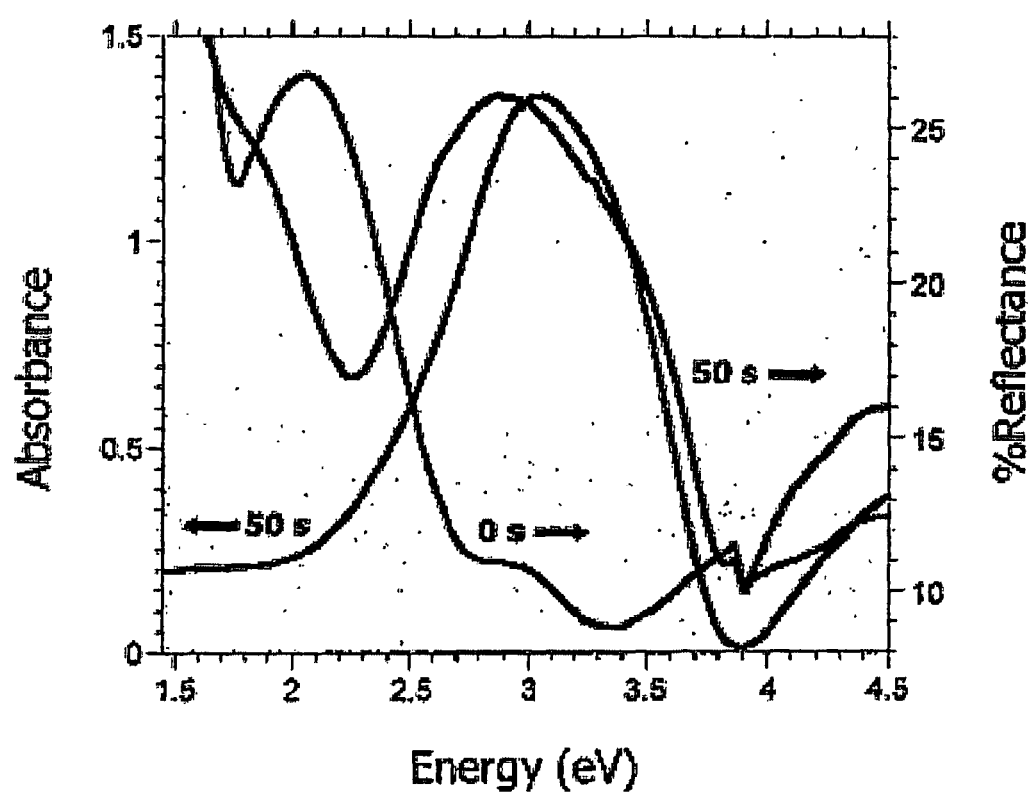
FIG. 7 shows a graphical representation of the reflectance of yet another embodiment of the material of this invention.

FIG. 7 shows the reflectance of the void-column Si film that was coated with Ag nanoparticles for 50 s in the 0.001 M $Ag_2SO_4$ solution. The reflectance spectrum of an as-deposited void-column Si film is also plotted. The reflectance spectrum shows interference peaks that decay as energy increases. The pronounced reflectance band that emerges is due to the presence of Ag nanoparticles and is of about the same peak location and width as the Ag plasmon absorption band (also shown in FIG. 7). Hence, the trends in reflection mimic those in absorption. This is because scattering is strongest when the induced dipole is largest, coinciding substantially with the surface plasmon resonance. Therefore, sensors and detectors based upon surface plasmon resonance in reflectance mode can also be designed. Since all these features depend on the metal nano-particle composition, sensors and detection schemes based on absorption and alloying as well as those based on local environment changes may be developed.

Figure 8:
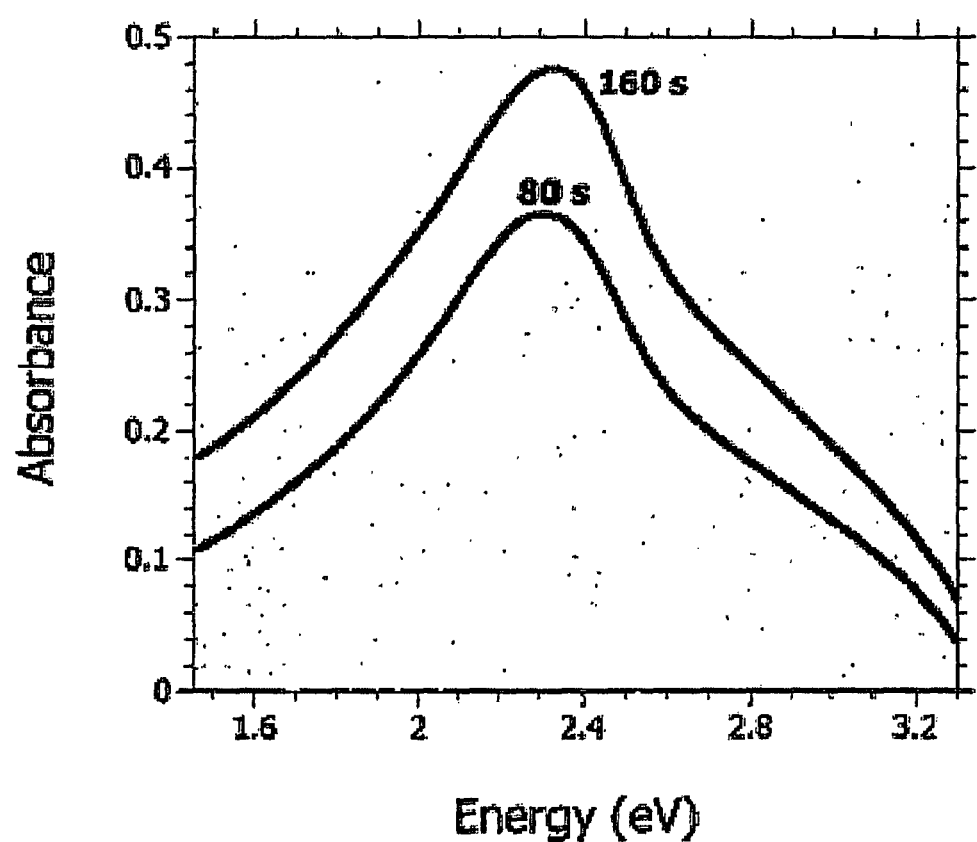
FIG. 8 shows a graphical representation of surface plasmon absorption bands of Au nanoparticles synthesized by the method of this invention.

FIG. 8 shows surface plasmon absorption bands of Au nanoparticles synthesized on the surface of a void-column Si film immersed in a commercial Au electroplating solution, diluted to 1:5 in $H_2O$, (obtained from Technic Inc., RI, with specification Techni Gold 25) for various immersion times (for 80 s and 160 s). The absorption peak at 2.3 eV is due to surface plasmon resonance in Au nanospheres.

While the above described embodiments have described in detail procedures, methodologies, and results for Ag or Au nanoparticles, the methods of this invention are not limited to those. The nanoparticles may comprise, but not limited to, silver, gold, iron, aluminum, titanium, nickle, tin, chrome, iron, iron oxide, cobalt, ruthenium, tungsten, zinc, palladium, platinum, or copper particles or alloy mixtures and compounds thereof. Similarly, the solutions utilized in the method of this invention may include, but are not limited to a copper sulfate, silver sulfate, silver nitrate, copper chloride, hydrogen tetrachloroaurate (III), gold chloride, palladium sulfate, palladium nitrate, other metal nitrates, other metal chlorides, or tetraamminepalladium (II) chloride metal salt-based solutions. Also, while the above detailed embodiments have described a nanostructured material deposited by plasma enhanced chemical vapor deposition (PECVD), the methods of this invention are not limited to this deposition technique. The nanostructured material may be prepared by, but not limited to the following: etching, a physical vapor deposition technique, a chemical vapor deposition technique, an electrochemical etching technique, a strain etching technique or a high density plasma deposition technique.

Figure 9:
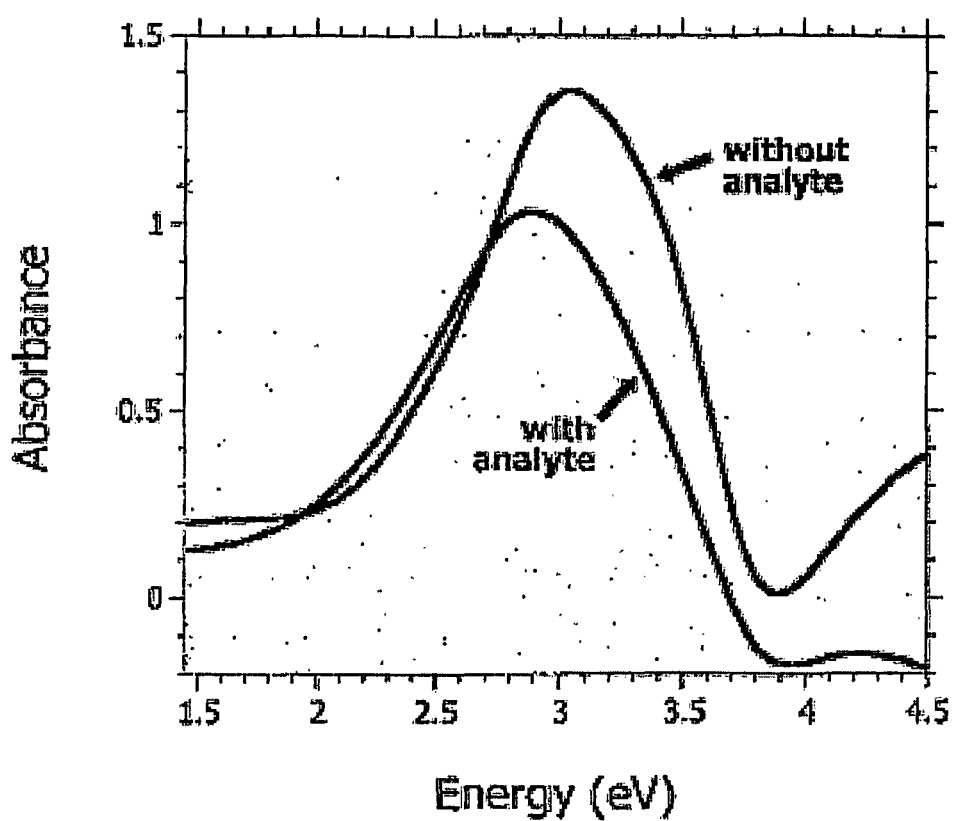
FIG. 9 shows a graphical representation of the performance of an embodiment of an SPR sensor manufactured by the method of this invention.
Figure 10:
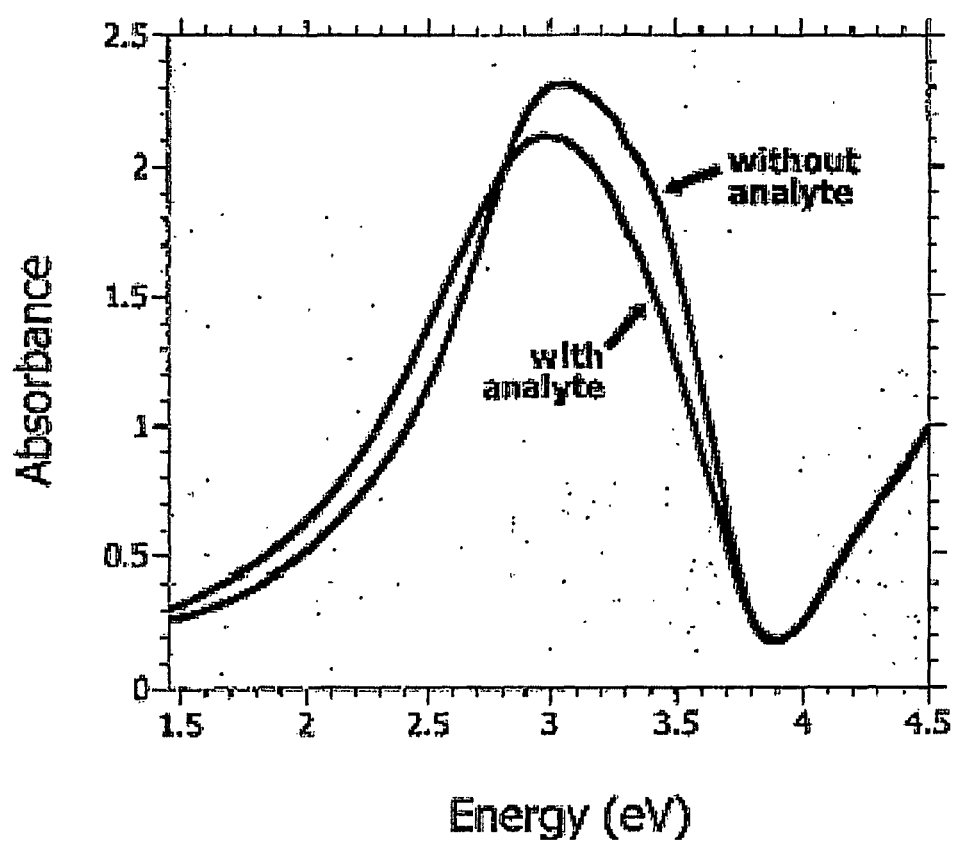
FIG. 10 shows a graphical representation of the performance of another embodiment of an SPR sensor manufactured by the method of this invention.
Figure 11:
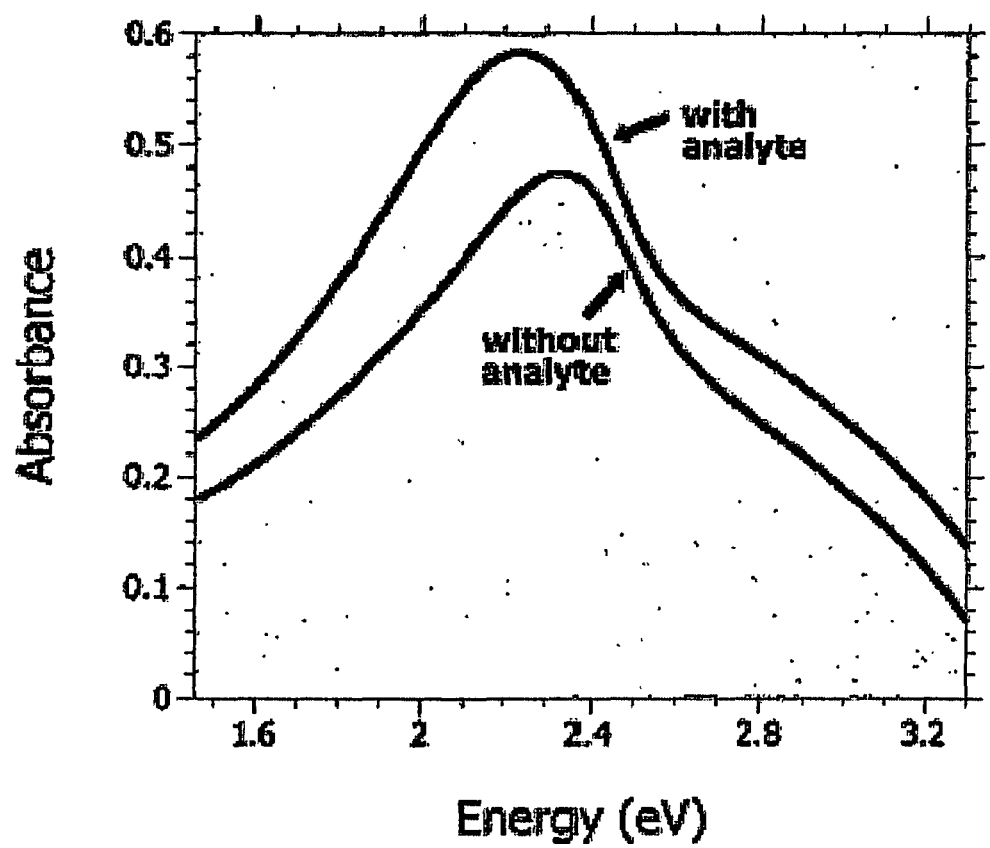
FIG. 11 shows a graphical representation of the performance of yet another embodiment of an SPR sensor manufactured by the method of this invention.

FIGS. 9, 10 and 11 demonstrate three SPR sensors fabricated from Ag or Au nanoparticle coated void-column Si films. The analyte molecule is methyl sulfoxide, which was spun on the films at 1000 rpm, for 20 s. Referring to FIG. 9, the nanostructured void-column Si film was coated with Ag nanoparticles by immersion in 0.001 M $Ag_2SO_4$ solution for 50 s. In FIG. 10, the nanostructured void-column Si film was coated with Ag nanoparticles by immersion in 0.001 M $Ag_2SO_4$ solution for 80 s. Referring to FIG. 11, the nanostructured void-column Si film was coated with Au nanoparticles by immersion in a commercial electroplating gold solution for 160 s. For both Ag and Au, the red shift of the plasmon band is a response to the presence of methylsulfoxide in the local environment of the nanoparticles. In this case this presence is specifically due to the adsorption of methylsulfoxide. Presence can be due to any binding or adsorption process. Adsorption can be in terms of physisorption or chemisorption. In addition, the analyte can further diffuse into the metallic nanoparticle and form an alloy or compound to change the plasmon frequency. In one embodiment, a mercury sensor can be fabricated in the case of Au nanoparticles. Once Hg adsorbs on Au particles, it will form amalgam at the surface of Au particles resulting in a shift of the plasmon peak energy/wavelength.

To the inventors' knowledge, the present technique is the only technique that describes a method of producing noble metal nanoparticles on a nanotextured/nanostructured surface without need for lithography, catalysts, electrical current, or vacuum deposition. Synthesis will occur electrolessly if the combination of reducing reaction and all other reactions happening at the same time are thermodynamically favorable. If the nanostructured surface is Si, then, for example, but not limited to, Ag, Au, Cu, Pt, Pd nanoparticles can be synthesized on this surface without electrically biasing the Si surface. In order to synthesize some other nanoparticles (for example, but not limited to, Fe or Ga), the Si surface should be electrically biased (negative for the case of Fe or Ga). It should be noted that electrically biasing the Si surface to form isolated nanoparticles differs from plating onto the Si surface which is done for continuous film formation.

Besides its remarkable simplicity and speed in the synthesis of nanoparticles, the present approach offers the possibility of fabricating higher sensitivity SPR sensors by virtue of the enhanced surface area provided by the void-column morphology (interconnected void network) available for nanoparticles as well as analyte molecules.

The surface plasmon resonance can be made stronger by increasing the number of metal nanoparticles per unit area of the substrate and by increasing the void-column film thickness (as shown in FIG. 4) without changing the average spacing between particles. In other words, the present approach results in a 3-D array of nanoparticles rather than a 2-D array, with a higher areal density of nanoparticles for a given interparticle spacing. Therefore, sufficiently large interparticle spacing can be maintained with weak electromagnetic coupling between particles, yet a high signal to noise ratio can still be obtained with a high number of nanoparticles per unit area. Furthermore, void-column morphology also enables dramatically enhanced sensing of vapors by means of capillary condensation in the voids, since the analyte is expected to yield a much higher surface plasmon shift in liquid phase (higher refractive index) than in vapor phase.

In one embodiment of the present invention allows the nanotextured/nanostructured film driving the nanoparticle formation and holding the formed nanoparticles is a deposited film. Consequently, this film may be formed on any substrate including plastics, ceramics, glasses, semiconductors, metals, and organic materials. In light-exposure based sensing and detection techniques, this substrate flexibility can allow light impingement from above or below. A deposited nanotextured film also allows light reflecting, enhancing, and processing films and structures to be integrated.

The present approach of synthesizing nanoparticles on nanostructured and/or nanotextured surfaces by immersion in chemical solutions can also be used to obtain nanoparticle-based catalysts where the synthesized nanoparticles are supported on a high surface area (e.g., porous) substrate. In fact, many industrial catalysts are comprised of nanoparticles dispersed on a support. A particular advantage of this invention is the immobilization of said catalyst and the absence of any surface coatings needed in the colloidal chemistry as practiced in the art.

The key advantages of utilizing nanoparticles as catalysts are: 1) catalytic activity can be dramatically enhanced and tuned by the shape and size of the nanoparticles (or futures of the structure) resulting in lower reaction temperatures and faster reaction rates; 2) selectivity can be tuned by the size and shape of the nanoparticles; 3) extreme enhancements in surface area can lead to enhanced yield; and 4) nanoparticle regeneration may occur. These advantages help decrease pollution, raw material and energy consumption, and enhance yield.

Catalytic activity is known to be high at edges and kinks. The higher free energy at strained, broken bonds helps surmount the activation barrier. In general, catalytic activity increases with decreasing particle/feature size as the reduced radius of curvature leads to more strained and/or unsatisfied bonds at the surface. Scanning tunneling microscope (STM) images of catalyst nanoparticles show the presence of different electron states on the surface of the nanoparticles. These surfaces differ from regular (bulk) surfaces. Quantum confinement modified electron states below the surface may also play a role in catalytic activity. Quantum confinement alters density of electron state distribution. In severe confinement, work function or Fermi level (electrochemical potential) changes and discrete (atomic like) states can emerge above and below the conduction band. This can significantly enhance electron transfer across the surface during a chemical reaction.

In general, catalytic activity increases with decreasing size down to approximately 1-3 nm. However, catalytic activity starts to decrease below a critical size. Hence, a resonance condition is implied that depends on the energy distribution of electron states.

The method of this invention can be employed to fabricate catalytic sensors. For instance, $H_2S$ can be detected by Au particles, while NO and CO can be detected with Ti, Au, Pt, Pd particles on the basis of chemical reactions of such gases catalyzed by such catalyst metal nanoparticles.

On the other hand, a novel $H_2$ sensor was demonstrated by the method of this invention as follows: The previously described nanostructured void/column Si film was immersed in 0.002 M tetraamminepalladium (II) chloride solution for 90 s to synthesize Pd nanoparticles. The presence of spherical Pd nanoparticles was confirmed by SEM. Also a broad plasmon band of nanoparticles was seen by optical absorption spectroscopy. The conductivity of the Pd nanoparticle/Si nanocolumn film was monitored by coplanar electrodes in pure $N_2$ gas versus forming gas (4% $H_2$ in $N_2$ gas). When the ambient gas is switched from $N_2$ to forming gas a 2.5-fold increase was recorded in conductivity. This enhancement is due to volumetric expansion of Pd nanoparticles in the presence of $H_2$. When Pd particles expand, they have improved physical contact and electrical contact with Si nanocolumns or with other Pd particles. In particular, being in between Si columns, they electrically bridge the separated Si columns together more effectively upon expansion. This enhances the effective cross sectional area available for charge transport. As a result, conductivity increases.

In addition, the present invention can be used to synthesize and disperse nanoparticles of low electronegativity and/or highly combustible such as Al to be utilized as a fuel.

Figure 12:
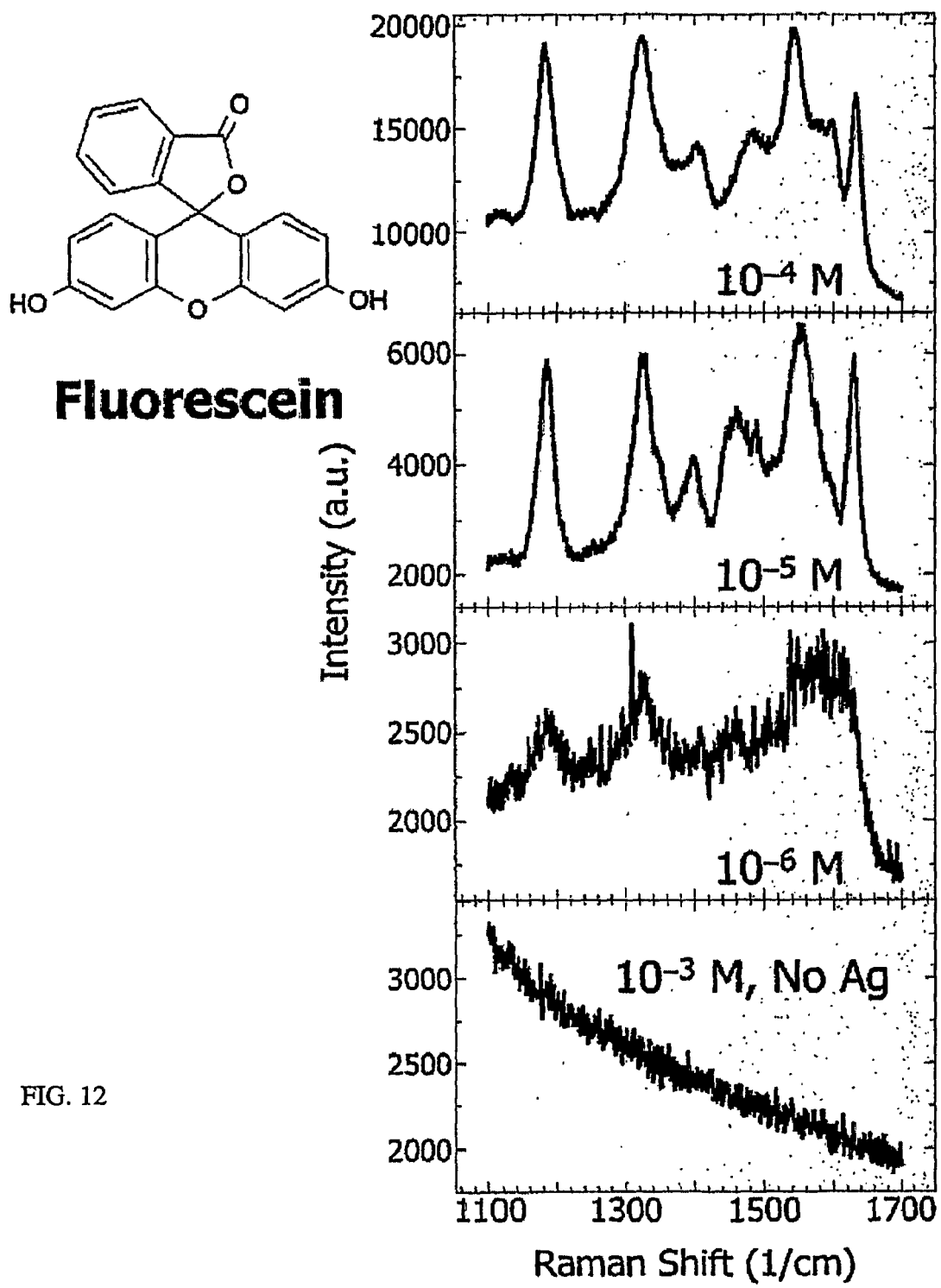
FIG. 12 shows a graphical representation of the performance of a surface enhanced Raman scattering (SERS) sensor manufactured by the method of this invention; and, FIG. 13 shows a graphical representation of enhancement of optical absorption in rhodamine when coated on a material of embodiment of the material of this invention.

In addition, various nanostructured/nanotextured surfaces coated with metal nanoparticles utilizing the method of this invention can serve as surface enhanced Raman scattering (SERS) active substrates. FIG. 12 further exemplifies SERS activity of a composite material of this invention; e.g., a nanostructured void-column Si film coated with Ag nanoparticles. In the embodiment shown in FIG. 12, the analyte molecule is fluorescein and the nanostructured void-column Si film was coated with Ag nanoparticles which covered and infused the film by immersion in 0.001 M $Ag_2SO_4$ solution for 110 s. The bottom graph shows the Raman signal without the presence of Ag nanoparticles. In this embodiment, the analyte molecule was applied as 1.0 mL of solution on the Ag nanoparticle coated film. This analyte solution was subsequently left to dry. A laser beam was directed at the center of the spot where the 1.0 mL analyte solution droplet had dried. In general, for analyte concentrations higher than $10^{-7}$ M, the analyte spot is visible to the naked eye in the form of a circular stain after the droplet dries. Measurements may also take place in the wet state before the solution dries. These wet state measurements may be done in a number of ways including leaving the solution free on the surface (e.g., droplet) or using confinement. In an example of using confinement a cover glass was utilized to confine the analyte solution between the substrate and cover slide. It should be noted that this example is not a limitation of this invention, other methods are within the scope of the invention. Furthermore, an immersion lens can also be used.

In addition, alternative means of applying the analyte molecule(s) to the nanoparticle coated surface may be employed. These include spinning, spraying, inkjet/robotic printing from a solution, and diffusion or convection from the gas/vapor or plasma phase. A different approach involves applying a mixture of the metal salt solution and the analyte solution to the virgin nanostructured film surface (uncoated with metal nanoparticles). In this approach, the metal nanoparticles are only synthesized where the solution mixture is applied and within the time that the droplet dries. Hence, synthesis of metal nanoparticles and attachment of analyte molecules on them occur simultaneously. This minimizes the exposure of the metal particle surface to ambient before analyte is adsorbed on it. As a result, background noise due to contaminants like hydrocarbons is reduced.

In SERS, the enhancement in Raman signal is principally attributed to enhanced electric fields in the neighborhood of metal particles. Once the surface plasmon modes (collective oscillations of free electrons) in a metal nanoparticle are in resonance with the impinging electromagnetic field such as an impinging laser beam, strong oscillating dipoles are induced in the nanoparticle that in turn develop strong local electric fields in their vicinity. The amplitude of the local electric field decays exponentially along the nanoparticle surface normal with a characteristic decay length of 5-6 nm or a saturation distance of about 30 nm. (See A. J. Haes and R. P. Van Duyne, J. Amer. Chem. Soc. 124, 10596 (2002)) This region of amplification in local electric field is for both incident light and Raman scattered light. As a result, enormous gains are possible in the intensity of the SERS signal that is the fingerprint of the adsorbed molecule, as noted earlier.

These local field enhancements can also lead to enhancements in other transitional phenomena such as optical absorption, reflectance, fluorescence, ionization, field emission, charge separation, and stimulated emission, etc. upon which novel sensors and devices can be based. For example, Lacowicz et al. (J. R. Lakowicz, B. Shen, Z. Gryczynski, S. D'Auria, and I. Gryczynski, Biochem. and Biophys. Res. Comm. 286, 875 (2001)) have recently shown that intrinsic fluorescence from DNA can be enhanced 80-fold in the presence of Ag nanoparticles.

Ionization sensors may be fabricated by the methods of this invention utilizing the enhancements to the transitional properties obtained from a material of this invention.

Figure 13:
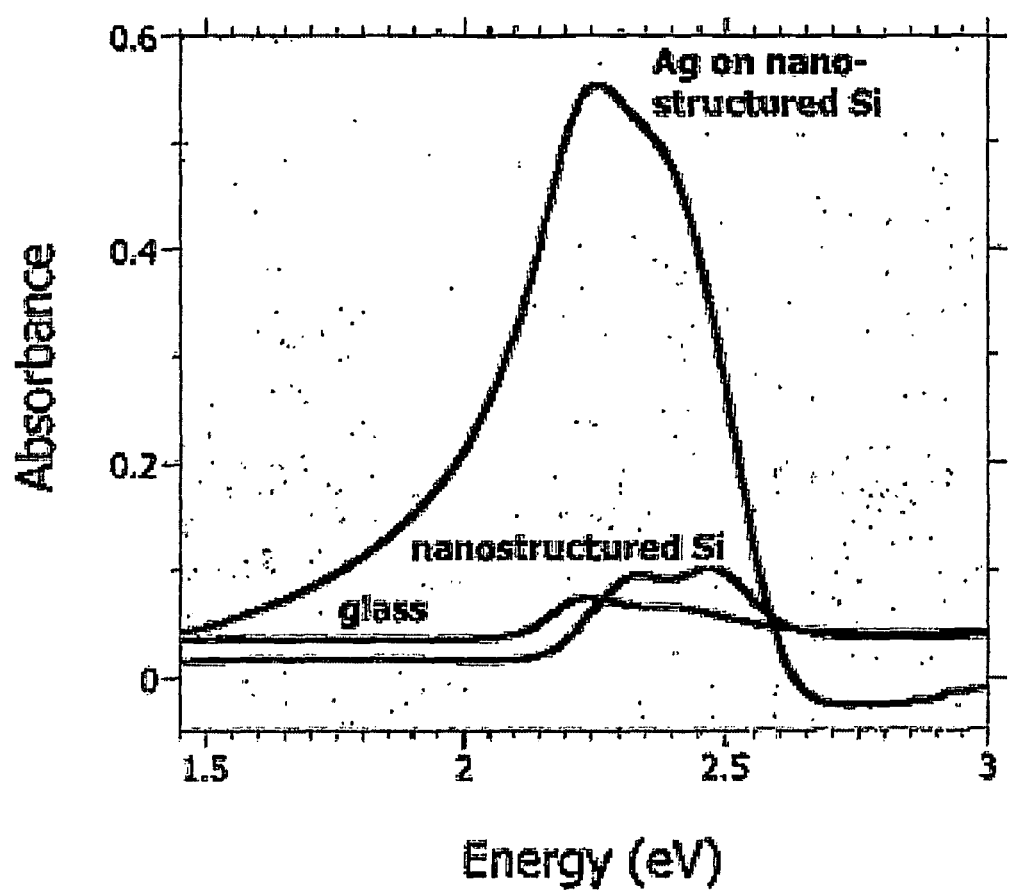

FIG. 13 depicts enhancement of optical absorption in rhodamine when it is coated on the Ag nanoparticle deposited nanostructured/nanotextured Si surface of this invention. In the embodiment shown in FIG. 13, rhodamine was spun on three different substrates at 1000 rpm for 10 s (0.001 M dissolved in cyclohexanone. The Ag/Si nanocomposite substrate used for this spin-on had been prepared by immersion of a nanostructured void-column Si film in 0.001 M $Ag_2SO_4$ solution for 90 s. The rhodamine spectrum for each case was obtained by subtracting the substrate absorbance from substrate+rhodamine absorbance. Enhancement in optical absorption is evident in the presence of Ag nanoparticles. A blueshift of absorption is also seen when it is spun on nanostructured Si. These data also show that such enhanced local fields and resulting enhanced optical absorption can be employed to enhance the rate of certain photochemical reactions.

Further, the present invention can be employed to fabricate a photovoltaic device (solar cell) with an enhanced optical absorption and an improved conversion efficiency. In one embodiment, instead of rhodamine of FIG. 13, the metal nanoparticle deposited nanostructured surface of this invention may be coated with a photovoltaic material. This photovoltaic material may be, but not limited to, an electron or hole transport layer or both such as a semiconductor, conjugated polymer, conducting polymer, conducting oligomer, or metal. This layer can be applied in solution form, molten form, or as vapor form to solidify on the nanoparticle coated surface of this invention. This layer material can impregnate into the void network of the initial material (which here is the nanostructured film/surface coated with metal nanoparticles of this invention). Subsequently, the whole structure (nanostructured film/surface, nanoparticles synthesized on the nanostructured film/surface, and photovoltaic layer coated on the nanoparticle) can be sandwiched between two contact/electrode layers to obtain a photovoltaic device. In this device the photo-carriers (electrons and holes) are generated in the nanostructured film/surface material and/or the photovoltaic layer coated on it. In this device, the nanoparticles create their enhanced, localized electric fields and enhanced absorption. In addition, in this device the photo-carriers (electrons and holes) can also be generated in the metal nanoparticles in view of Sonnichsen et al. (Phys. Rev. Lett. 88, p. 077402-1), who reported on nonradiative decay of particle plasmons into electron-hole pairs. In this case, the nanostructured film/surface material and the coated photovoltaic layer will collect the photogenerated electrons and holes from the nanoparticles.

Since the nanoparticle-nanostructure composite of this invention enables modification of absorption and emission characteristics, the material of this invention may be used as a gain medium to fabricate stimulated emission devices. Similarly, the material of this invention may be used to fabricate a fluorescent device, fluorescence detection system or fluorescence enhancing apparatus, a device capable of coupling electromagnetic radiation from one system to another in opto-electronic or photonic structures (by fluorescence or emission), or an anti-reflection coating.

FIG. 3 indicates that plasmon absorption associated with Ag nanoparticles disposed on a nanostructured void column Si surface can be controllably increased by prolonging immersion time. For the 80 s sample, the optical absorbance is seen to be above 2 at 3 eV, which corresponds to an optical transmission of less than 0.01. Hence, almost complete coupling of the electromagnetic (optical) energy to plasmon modes occurs. Therefore, the nanoparticle coated nanostructured surfaces described herein may be utilized in photonics to couple light from one system to another by utilizing the above property and the fluorescence or emission property of the material of this invention. Furthermore, such material compositions in thin film form of this invention may serve as antireflection coatings based on the change in the optical absorbance and/or the optical reflection due to properties of the material of this invention.

Finally, nanoparticles of varying density may be selectively patterned on the nanostructured surface by employing a technique such as dip pen lithography. In this manner, optical and magnetic information storage systems can be built since a patterned structure can be formed. Similarly, since the absorbance and fluoresce can be modified, optical memories can be manufactured utilizing these properties. Nanoparticles with magnetic properties may be used to manufacture magnetic storage devices.

Although the invention has been described with respect to various embodiments, it should be realized this invention is also capable of a wide variety of further and other embodiments within the spirit and scope of the appended claims.

What is claimed is:
1. A composition comprising:
   a substrate;
   an array of nanostructured silicon columns defining a three-dimensional surface and an interface with a void volume, said array of nanostructured silicon columns extending from said surface, each of said array of nanostructured silicon columns having a width of between 20 and 30 nanometers and a lateral surface;

a plurality of metallic nanocrystals spaced uniformly along the lateral surface of each of said array of nanostructured silicon columns between columns of said array of nanostructured silicon columns, said plurality of metallic nanocrystals exhibiting surface plasmon resonance.

2. The composition of claim 1 wherein said substrate is planar glass.

3. The composition of claim 1 wherein said array of nanostructured silicon columns have an average columnar separation of 20 nanometers.

4. The composition of claim 1 wherein said array of nanostructured silicon columns has a height of less than 2000 Angstroms and a columnar width of 20 to 30 nanometers.

5. The composition of claim 1 wherein the three-dimensional surface has an oxide layer underlying said plurality of metallic nanocrystals.

6. The composition of claim 1 wherein said plurality of metallic nanocrystals are formed from the element of silver, gold, copper, iron, palladium, or platinum.

7. The composition of claim 1 wherein one of said plurality of metallic nanocrystals is formed from the element of silver and bridges two spatially separated adjacent columns of said array of nanostructured silicon columns.

* * * * *